United States Patent
Eskilsson et al.

(10) Patent No.: US 12,215,653 B2
(45) Date of Patent: Feb. 4, 2025

(54) ROD SEAL ASSEMBLIES FOR MACHINES WITH CROSSHEADS AND SEALED OSCILLATING RODS

(71) Applicant: EnergyIntel Services Ltd., Nicosia (CY)

(72) Inventors: Per Eskilsson, Åmål (SE); Andreas Verner, Karlstad (SE); Francisco Xavier Borras, Enschede (NL); Andreas Baumueller, Tuebingen (DE); Åke Edvinsson, Åmål (SE); Olle Sääw, Sollebrunn (SE)

(73) Assignee: EnergyIntel Services Ltd., Nicosia (CY)

( * ) Notice: Subject to any disclaimer, the term of this patent is extended or adjusted under 35 U.S.C. 154(b) by 26 days.

(21) Appl. No.: 17/425,873

(22) PCT Filed: Jan. 29, 2020

(86) PCT No.: PCT/SE2020/050073
§ 371 (c)(1),
(2) Date: Jul. 26, 2021

(87) PCT Pub. No.: WO2020/159423
PCT Pub. Date: Aug. 6, 2020

(65) Prior Publication Data
US 2022/0120236 A1    Apr. 21, 2022

(30) Foreign Application Priority Data

Jan. 29, 2019 (SE) .................................. 1950105-5
Jan. 29, 2019 (SE) .................................. 1950106-3

(51) Int. Cl.
*F16J 15/56* (2006.01)
*F02G 1/053* (2006.01)

(52) U.S. Cl.
CPC ............ *F02G 1/0535* (2013.01); *F16J 15/56* (2013.01)

(58) Field of Classification Search
CPC ................................ F16J 15/56; F02G 1/0535
See application file for complete search history.

(56) References Cited

U.S. PATENT DOCUMENTS 706,290 A * 8/1902 Zwart .................. F02G 1/0535
                                                  277/509
743,705 A    11/1903 Fogh
(Continued)

FOREIGN PATENT DOCUMENTS

CN     104595055 A    5/2015
CN     105190001 A    12/2015
(Continued)

OTHER PUBLICATIONS

International Search Report, issued in PCT/SE2020/050073, dated Apr. 30, 2020.
(Continued)

*Primary Examiner* — Gilbert Y Lee
(74) *Attorney, Agent, or Firm* — McCarter & English, LLP; Dave S. Christensen

(57) ABSTRACT

A rod seal assembly for a machine includes a crosshead and a sealed oscillating piston rod. The rod seal assembly includes a seal housing, a rod seal, a bushing and a rod seal base, wherein the rod seal, bushing and the rod seal base are annular and can be laterally moved in relation to the seal housing the housing axially supports the rod seal base, the rod seal base is adapted to be arranged around the piston rod and is provided with a base portion, wherein the base portion includes a lower axial surface directed in a first axial direction an upper axial surface directed in a second axial direction, wherein the lower axial surface abut the housing and the upper axial surface is provided with a rod seal seat, (Continued)

the rod seal is adapted to be arranged around the piston rod, and has a first end portion and a second end portion, wherein the first end portion is arranged to connect to the rod seal base in the first axial direction, and the bushing is arranged to abut the rod seal in the first axial direction, and the rod seal base and the bushing are arranged to have an axial overlap.

25 Claims, 10 Drawing Sheets

(56) References Cited

U.S. PATENT DOCUMENTS

| | | | |
|---|---|---|---|
| 758,410 A | 4/1904 | Burnside | |
| 759,330 A * | 5/1904 | Van Dervort | F16J 15/3224 |
| | | | 277/548 |
| 965,688 A * | 7/1910 | Claflin | E21B 33/08 |
| | | | 277/529 |
| 1,196,652 A | 8/1916 | Brignoni | |
| 2,368,883 A | 2/1945 | Coopy | |
| 2,647,720 A * | 8/1953 | Volpin | F16K 5/225 |
| | | | 137/246.22 |
| 4,080,788 A * | 3/1978 | Kantz | F16J 15/56 |
| | | | 184/6 |
| 4,235,445 A | 11/1980 | Lundholm et al. | |
| 4,251,081 A | 2/1981 | Skoog | |
| 4,452,042 A | 6/1984 | Lindskoug | |
| 4,832,352 A | 5/1989 | Sjöstedt | |
| 4,878,815 A * | 11/1989 | Stachowiak | F04B 53/1025 |
| | | | 417/454 |
| 4,936,197 A | 6/1990 | Brent | |

FOREIGN PATENT DOCUMENTS

| | | |
|---|---|---|
| CN | 106232972 A | 12/2016 |
| CN | 108026978 A | 5/2018 |
| CN | 108137086 A | 6/2018 |
| GB | 1 496 986 | 1/1978 |
| JP | 63-251669 A | 10/1988 |

OTHER PUBLICATIONS

Written Opinion of the International Searching Authority, issued in PCT/SE2020/050073, dated Apr. 30, 2020.

Office Action from related Chinese Patent Application No. 202080014664.7 issued May 9, 2024.

Mexican Office Action for Application No. MX/a/2021/008978, dated Jul. 22, 2024, 16 pages.

* cited by examiner

ROD SEAL ASSEMBLIES FOR MACHINES WITH CROSSHEADS AND SEALED OSCILLATING RODS

FIELD OF THE INVENTION

The present disclosure relates to rod seal assemblies for machines with crossheads and sealed oscillating piston rods. In particular it relates to a rod seal assembly comprising an annular sealing ring arrangeable around the piston rod.

BACKGROUND OF THE INVENTION

In a machine with a sealed oscillating rod, such as a Stirling-engine, -heatpump or -cryo-machine, there exists a high-pressure region within a cylinder separated from a relatively lower pressure region. Clearly, the high-pressure region must be sealed from the lower pressure region to maintain the pressure difference.

Generally, the piston rod must extend through the seal between the high-pressure region and the low-pressure region, resulting in the piston rod seal forming the primary seal between the high pressure and low-pressure regions.

The piston rod together with the rest of the crank drive is generally also lubricated. The lubrication may also improve the sealing at the piston rod seal; however, it is not desired that the lubrication enters the high-pressure region of the cylinder as this would lead to increased wear and reduced efficiency of the engine. The high-pressure region of the cylinder is nominally a dry region of the cylinder.

U.S. Pat. No. 4,251,081 A discloses a piston rod seal comprising a gland with a tubular extension of slightly increasing diameter on the high-pressure side. The increasing diameter leads to a pumping effect at the part having the increased diameter during piston rod oscillation resulting in minimized oil transport to the high-pressure region of the cylinder. A disadvantage in sealing performance of such piston rod seals is, among other reasons, caused by the fact that piston rods move not only in their axial direction, they also move orthogonally/laterally due to some play in the guiding crosshead and piston guide. Reasons are friction and constrains between the seal and its support with respect to the rod seal housing. The limited movability of the annular seal laterally to the rod results in misalignment and allows some leaking of lubrication oil and gas.

SUMMARY OF THE INVENTION

Accordingly, the present invention preferably seeks to mitigate, alleviate or eliminate one or more of the above-identified deficiencies in the art and disadvantages singly or in any combination and solves at least the above-mentioned problems by providing a rod seal assembly for a machine comprising a crosshead and a sealed oscillating piston rod according to claim 1. The proposed rod seal assembly provides an improved lateral following of the rod seal and it's supporting parts to the piston rod. The rod seal assembly comprising:
a seal housing, a rod seal, a bushing and a rod seal base, wherein
the rod seal, bushing and the rod seal base are annular and can be laterally moved in relation to the seal housing the housing axially supports the rod seal base,
the rod seal base is adapted to be arranged around the piston rod and is provided with a base portion, wherein the base portion comprises
a lower axial surface directed in a first axial direction an upper axial surface directed in a second axial direction, wherein
the lower axial surface abut the housing and the upper axial surface is provided with a rod seal seat with a conical seat,
the rod seal is adapted to be arranged around the piston rod, and has a first end portion and a second end portion, wherein the first end portion is arranged to connect to the rod seal base in the first axial direction, and
the bushing is arranged to abut the rod seal in the first axial direction, wherein the rod seal base and the bushing are arranged to have an axial overlap.

One exemplary effect of the axial overlap is that the bushing can be aligned with the rod seal base, whereby the lateral movement of the piston rod which is transferred to the rod seal also is transferred to the base and further to the bushing, whereby all lateral movable parts are aligned through the rod seal contact with the piston rod. Aligning all lateral movement of the rod seal assembly reduces the wear of the rod seal assembly.

The rod seal can be provided with an internal diameter which tapers outward towards its upper portion such that it has an internal diameter at its upper portion, which is greater than the external diameter of the piston rod and greater than the internal diameter of its lower portion.

The rod seal base and the rod seal can be integral parts or be separate parts abutting each other. In one exemplary embodiment the rod seal base and the rod seal are separate parts, whereby the rod seat base is provided with a conical seat adapted to receive a correspondently conical first end portion of the rod seal.

In one exemplary embodiment the rod seal is made of a soft seal material in order to be able form a tight seal towards any abutting surfaces. Exemplary materials are PTFE, PEEK, PI and compounds thereof, Nitrile, Neoprene, EPDM, rubber, fluorocarbon and silicone.

In one exemplary embodiment the rod seal base is made of a rigid material, such as a metal or a polymer or a composite material. The bushing is made of a material with at least a rigidity allowing it to transfer the needed axial forces upon the rod seal.

In one exemplary embodiment of the overlap, the axial overlap is formed by that the bushing extends in the first axial direction towards the rod seal base at least partially past where the bushing abuts the rod seal.

In one exemplary embodiment of the overlap, the axial overlap is formed by that the rod seal base extends in the second axial direction towards the bushing at least partially past where the rod seal base abuts the rod seal.

In one exemplary embodiment of the overlap, the rod seal base and the bushing have a radial contact at the axial overlap. The radial contact is preferably constructed with a minimal of play, whereby one exemplary effect thereof is that a lateral alignment between is maximised.

In another exemplary embodiment, the rod seal comprises a shoulder portion, and the bushing comprises a corresponding shoulder portion arranged to mate with the shoulder portion of the rod seal.

In one exemplary embodiment, the shoulder portions are corresponding conical shoulder portions such that a radial force is applied to the rod seal toward the piston rod.

In one exemplary embodiment of the rod seal, the shoulder portion of the rod seal is provided with a secondary seal ring. The secondary seal ring is adapted to seal between the bushing and the rod seal seat.

In one exemplary embodiment of the rod seal assembly, at both axial sides of the base portion of the rod seal base, the seal housing extends radially inwards relative an outer periphery of the base of the rod seal base. The seal housing thereby at least partially encloses the rod seal base on both axial sides. One exemplary effect thereof is that equalising pressure surfaces can be created upon the rod seal base, which pressure surfaces can reduce the friction between the rod seal base and the housing.

In another exemplary embodiment of the rod seal assembly, an inner seal ring is arranged between lower surface of the base and the seal housing. A seal ring is normally arranged in a slot to be arranged at a specific radial distance from a centre axis (in this case the axis of the piston rod). The slot can be provided in either the housing or the lower surface of the base. One exemplary advantage by providing an inner seal ring is that an inner region with reduced diameter is formed by the inner seal ring. The inner region forms an inner wet part that is lubricated, whereby also an outer (radial outside the inner seal ring) dry part that is not lubricated is created. The reduced and lubricated diameter results in less friction and wear between the rod seal base and the seal housing during lateral movement therebetween, is achieved.

In another exemplary embodiment of the rod seal base, lower surface of the base is provided with an annular slot, wherein the annular slot is defined by at least one radial inner wall at which the inner seal ring is arranged. The annular slot can be open, i.e. not having an outer radial wall, or at least partially closed, i.e. be provided with an outer radial wall. One exemplary effect with an open slot is that the only attachment point between the rod seal base and the housing is the lubricated area between the inner seal and the piston rod.

In one exemplary embodiment rod seal assembly, an outer seal ring is arranged between the lower surface of the base and the seal housing, wherein the outer seal ring is arranged radially outside the inner seal ring.

In one exemplary embodiment of the rod seal base, the annular slot comprising an outer radial wall and the outer seal ring is arranged at the outer radial wall.

When an inner and an outer seal ring are provided between the rod seal base and the housing, they can be provided in the same annular slot or in separate annular slots. If the same annular slot is used, the annular slot can have radial extension such that a space is created between the inner seal ring, the outer seal ring, the rod seal base and the housing. A corresponding space can be created also when separate annular slots are used, by adjusting the distance between the rod seat base and the housing in between the two annular slots/the inner and outer seal ring.

In one exemplary embodiment of the rod seal base, the base further comprising a pressure relief channel arranged to connect the lower and the upper axial surfaces of the base.

In one exemplary embodiment of the rod seal assembly, it further comprises an upper seal ring provided between the upper axial surface of the rod seal base and the seal housing and the pressure relief channel mouth at the lower axial surface radially between the inner and outer seal ring and mouth at the upper axial surface radially inside the upper seal ring.

One exemplary effect of the pressure relief channel is that it equalises the pressure of the upper surface (directed in the second radial direction) of the rod seal base and the lower surface (directed in the first axial direction) of the rod seal base, i.e. the lower axial surface between the inner and outer seal ring are subjected to the high pressures from inside the compression chamber. One exemplary effect thereof is that by adjusting the axial surfaces subjected to the pressure of the high pressure side, such that the resulting pressure force is essentially zero, a reduced axial normal force can be achieved upon the rod seal base, wherein less friction and wear between the rod seal base and the seal housing during lateral movement therebetween is achieved.

In one exemplary embodiment of the rod seal assembly, an outer diameter of the upper seal ring is less than an outer diameter of the outer seal ring. An effect exemplary effect thereof is that a pressure force equilibrium can be created.

In one exemplary embodiment of the rod seal base, an upper axial surface of the rod seal base being radially inside the upper sealing and radially outside the outer sealing is essentially equal to the lower axial surface of the rod seal base radially inside the inner sealing. One exemplary effect thereof is that a pressure equilibrium that reduces friction between the rod seal base and the housing is achieved.

In one exemplary embodiment of the rod seal base, the lower axial surface of the base portion varies in axial extension such that it only abuts the seal housing radially outside the outer seal ring. I.e. radially inside the inner seal ring the rod seal base extends less in the first axial direction than radial outside the outer seal ring, whereby the base portion only abuts the seal housing radially outside the outer seal ring.

In one exemplary embodiment, the housing is provided with a channel extending from an ambient side outside of the rod seal assembly and into the rod seal assembly at a position in the proximity of and radially outside the outer seal ring. One exemplary effect thereof is that an ambient pressure is ensured the outside of the outer seal ring. Additionally, if the channel extends from the proximity of the opening for the piston rod, a lubrication of the lower surface of the rod seal base outside the outer seal can be achieved through the channel.

In one exemplary embodiment of the rod seal assembly, the rod seal base comprising a lateral bearing arranged to allow a lateral displacement of the rod seal base and the seal housing. One exemplary effect is that the lateral bearing can take up the lateral movement of the rod seal base, without a minimal friction between the parts and thereby minimal wear.

In one exemplary embodiments of the lateral bearing, the lateral bearing comprises a plurality of bearing rods extending from the housing in a first axial direction towards the rod seal base, which is suspended in the bearing rods. In one exemplary embodiment of the lateral bearing, a plurality of laterally flexible rods arranged to abut the housing in a first axial direction from the rod seal base. In one exemplary embodiment of the lateral bearing, it comprises a circular ball bearing and in another exemplary embodiment it comprises a laminated bearing, which comprises a plurality of flexible polymer layers between rigid layers. The lateral flexibility is relative the forces applied in the application.

In one exemplary embodiment of the rod seal assembly, the rod seal assembly is provided with a gas-permeable covering in proximity of the first end portion of the rod seal, wherein the covering is annular and guided by the bushing such that it follows lateral movements of the bushing. One exemplary effect of the covering is that it stops dirt to from entering the interior of the rod seal assembly and thereby minimises wear.

In another exemplary embodiment of the rod seal assembly, the rod seal assembly further comprises at least one spring member arranged to apply an axial force, in the first axial direction, to the rod seal via the bushing. One exemplary effect thereof is that the bushing can maintain a force acting on the rod seal and thereby secure a tight seal against the piston rod.

In one exemplary embodiment of the spring member, the spring member is arranged radially outside the rod seal and at least partially axial outside the bushing and at least partially at the same axial height as the bushing. One exemplary effect of providing the spring member radial outside the main parts of the rod seal is that the lateral movement of the bushing is not affected by the spring member. In one exemplary embodiment the spring member is an extension spring. One exemplary effect of providing an extension spring is that it does not buckle.

In another exemplary embodiment of the spring member, the bushing is provided with a radial flange wherein the at least one spring member is arranged radially outside of the bushings main body and extends between the flange and the seal housing.

One aspect of this disclosure concerns a machine comprises a crosshead, a sealed oscillating piston rod and a rod seal assembly according to any of the embodiments disclosed herein.

In one exemplary embodiment of the machine, the machine is a stirling engine.

Further advantageous embodiments are disclosed in the appended and dependent patent claims and in the below discussed drawings.

BRIEF DESCRIPTION OF THE DRAWINGS

These and other aspects, features and advantages of which the invention is capable will be apparent and elucidated from the following description of embodiments of the present invention, reference being made to the accompanying schematic drawings, in which.

DETAILED DESCRIPTION

Figure 6:
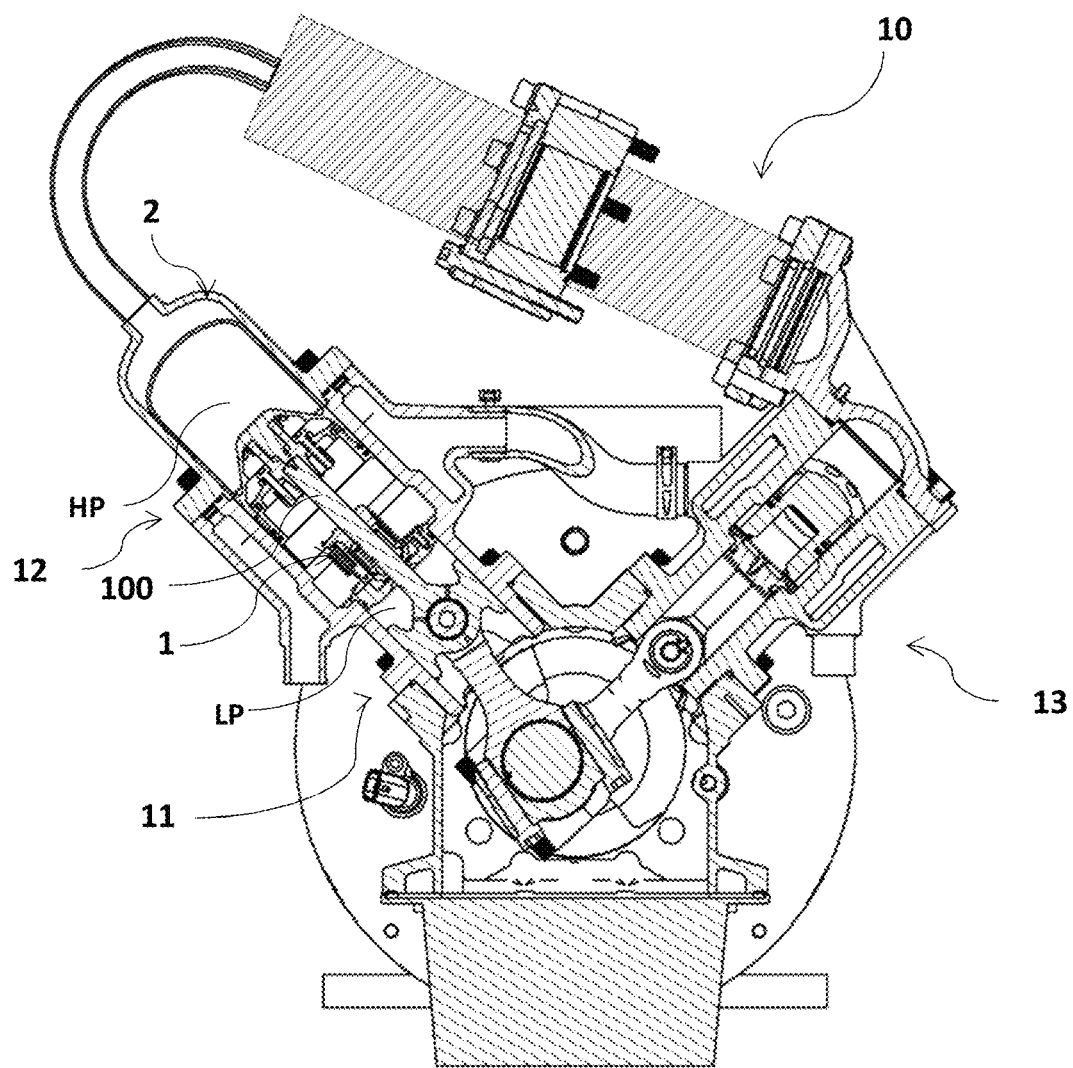
FIG. 6 discloses a schematic cross-sectional view of a stirling engine comprising a rod seal assembly.

The present disclosure relates to a piston rod seal assembly 1 for a machine 10 (FIG. 6) with crosshead 11 and a sealed oscillating piston rod 10 with a rod seal 101. The machine is typically a hot gas machine, e.g. a sterling engine comprising a compression 12 and an expansion cylinder 13. The compression cylinder 12 is provided with a rod seal assembly 1 according to any embodiment disclosed herein. The rod seal assembly 1 seals a high-pressure HP region in a cylinder from a low-pressure region LP. The low-pressure LP region has normally an ambient pressure. The rod seal assembly 1 furthermore seals and limits the ingress of lubricant into the high-pressure HP region of the cylinder. The rod seal assembly 1 disclosed herein results in reduced wear of the rod seal assembly 1 during of lateral movement of the piston rod 100, due to improved lateral following of the rod seal 101 and its supporting components, e.g. rod seal base 200, bushing 400, spring 500, with reduced wear on the rod seal assembly 1 components. Additional effects are thereby reduced leakage between the high-pressure HP and the low-pressure region as well as between the dry and the wet region, which essentially corresponds to the high pressure and low-pressure regions.

Figure 1:
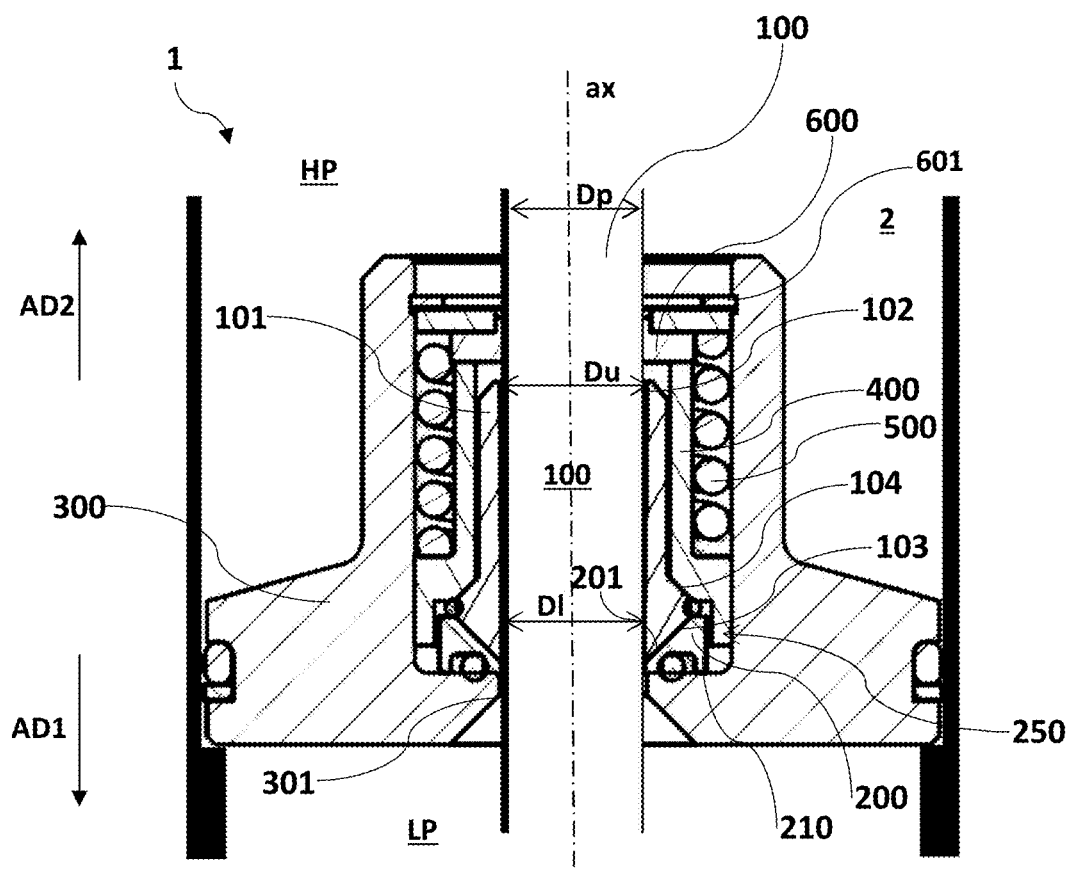
FIG. 1 is a schematic cross-sectional view of an embodiment of a rod seal assembly.

FIG. 1 discloses an exemplary embodiment of a piston rod seal assembly 1 according to this disclosure. The rod seal assembly 1 is provided in a cylinder 2 and comprises an annular rod seal 101 arranged around a piston rod 100. The rod seal 101 has a lower partial conical portion 103. That is, the lower portion of the rod seal 101 has a tapered external surface tapering inwardly toward its center, and thereby toward the piston rod 100. The lower conical portion 103 is arranged to contact a separate annular rod seal base 200. The rod seal base 200 and the rod seal 101 are provided within a seal housing 300. The rod seal base 200 seals between the seal housing 300 and the rod seal 101. The seal housing 300 has a passage 301 through which the piston rod 100 can be arranged and in which it oscillates. The seal housing 300 can furthermore form an enclosure or a partial enclosure for the rod seal assembly 1. The seal housing 300 can also be called seal plate 300.

An exemplary embodiment of the rod seal 101 has an internal diameter which tapers outward towards its upper portion 102 such that it has an internal diameter slightly larger than the external diameter Dp of the piston rod 100 at its upper portion 102. E.g. the upper internal diameter Du at the upper portion 102 of the rod seal 101 is larger than the lower internal diameter Dl of the lower conical portion 103 of the rod seal 101 and the upper internal diameter Du is thereby larger than the external diameter Dp of the piston rod 100, which is essentially equal to the lower internal diameter Dl.

The sealing ring 200 can also called a rod seal seat 200 or a rod seal base 200.

In one exemplary embodiment, the rod seal 101 and the rod seal base 200 forms one integral part. The rod seal base 200 thereby forms a lower portion of the rod seal 101, as exemplary disclosed in FIG. 3a-c. One exemplary effect thereof is that less individual parts are needed in the rod seal assembly 1.

In the embodiments disclosed in FIGS. 1, 2 and 3-5 and 6-9 the rod seal base 200 and the rod seal 101 are separate parts and the rod seal base 200 has a conical seat 201. The embodiments disclosing separate rod seal 101 and rod seal base 200 are interchangeable with the integral rod seal 101 and rod seal base 200.

Now, in the embodiment disclosed in FIG. 1, the conical seat 201 of the rod seal base 200 forms a conical seat for the rod seal 101. The piston rod 100, the rod seal 101, and the rod seal base 200 may all move laterally with respect to the seal housing 300. The rod seal base 200 is fixed laterally with respect to the piston rod 100. Compared to existing solutions the provision of the rod seal base 200 enables the piston rod 100 and rod seal 101 to move laterally and maintain sealing performance. This is because the rod seal 101 is not held with respect to the seal housing 300 but is rather free to move, at least slightly, laterally with lateral movements of the piston rod 100.

To maintain the lower conical portion 103 of the rod seal 101 within the rod seal base 200 a force is applied to the rod seal 101 toward the sealing ring 200. The force is an axial force, that is, it acts in the direction of the longitudinal extension of the rod seal 101. The force may be provided by a spring 500. The spring 500 may apply a force to a bushing 400 which is arranged around the rod seal 101. The bushing 400 may apply an at least axial force to the rod seal 101. The bushing 400 has a portion 402 for contacting the rod seal 101. The bushing 400 may be an annular bushing provided with an external shoulder 401 at its lower portion. The external shoulder 401 forms a seat for the lower portion of the spring 500. The spring 500 may be arranged around the bushing 400. The spring 500 may be radially outside the bushing 400. That is, the rod seal 101 may be within the bushing 400, the spring 500 may be outside the bushing 400. Alternatively, the axial force may be provided by an inherent springing capacity in a bushing 400.

As disclosed in all the disclosed embodiment of the rod seal assembly 1, the rod seal base 200 and the bushing 400 has an axial overlap 250 at which they have a radial contact, such that the bushing 400 is guided by the rod seal base 200, i.e. the bushing 400 is laterally aligned with the rod seal base 200. An exemplary effect thereof is that the bushing 400 always follows the lateral movement of the rod seal base 200.

Although not shown in the figures, the conical seat 201 and the lower conical portion 103 of the rod seal 101 may instead be flat, laterally extending portions forming a pair of mating surfaces. That is, the pair of mating surfaces extend at an angle of 90° to the longitudinal axis of the rod seal 101 and/or piston rod 100. In such an arrangement there is no radial force applied by the sealing ring 200 to the rod seal 101 or vice-versa. The sealing ring 200 and the rod seal 101 apply only an axial force, in line with the longitudinal axis of the rod seal 101 to each other.

Figure 3A:
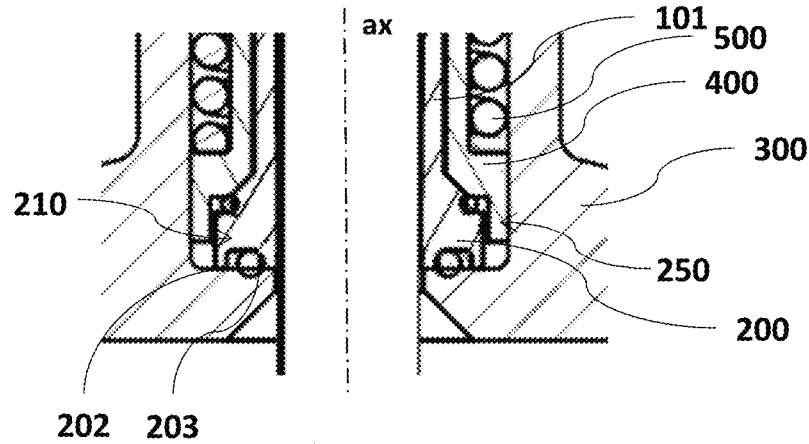
FIG. 3a-c discloses schematic cross-sectional views of embodiments of a rod seal with integrated rod seal base.
Figure 3B:
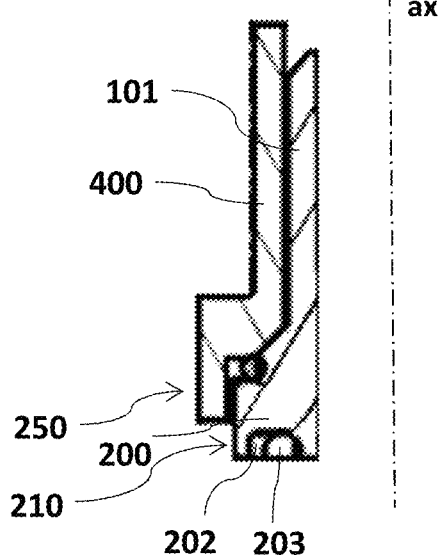
Figure 3C:
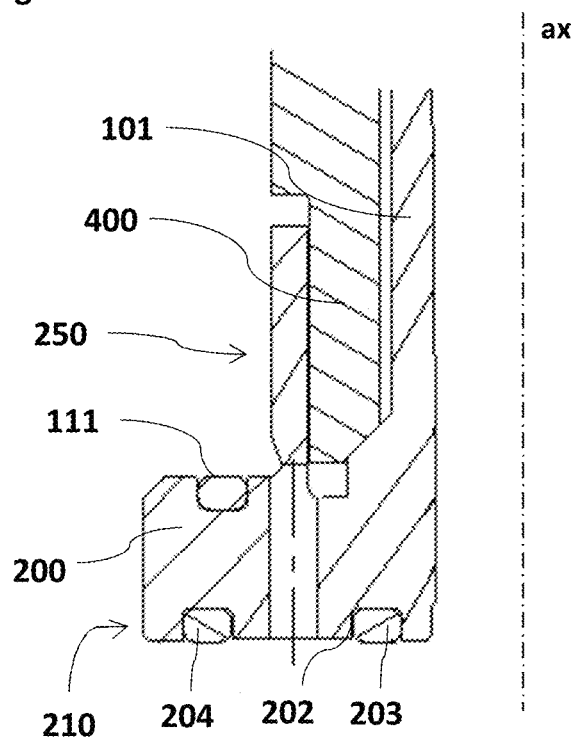

Embodiments where the rod seal 101 and the rod seal base 200 are integral are disclosed in FIG. 3a-c. The rod seal 101 comprises a lower portion being the sealing ring 200.

Figure 2:
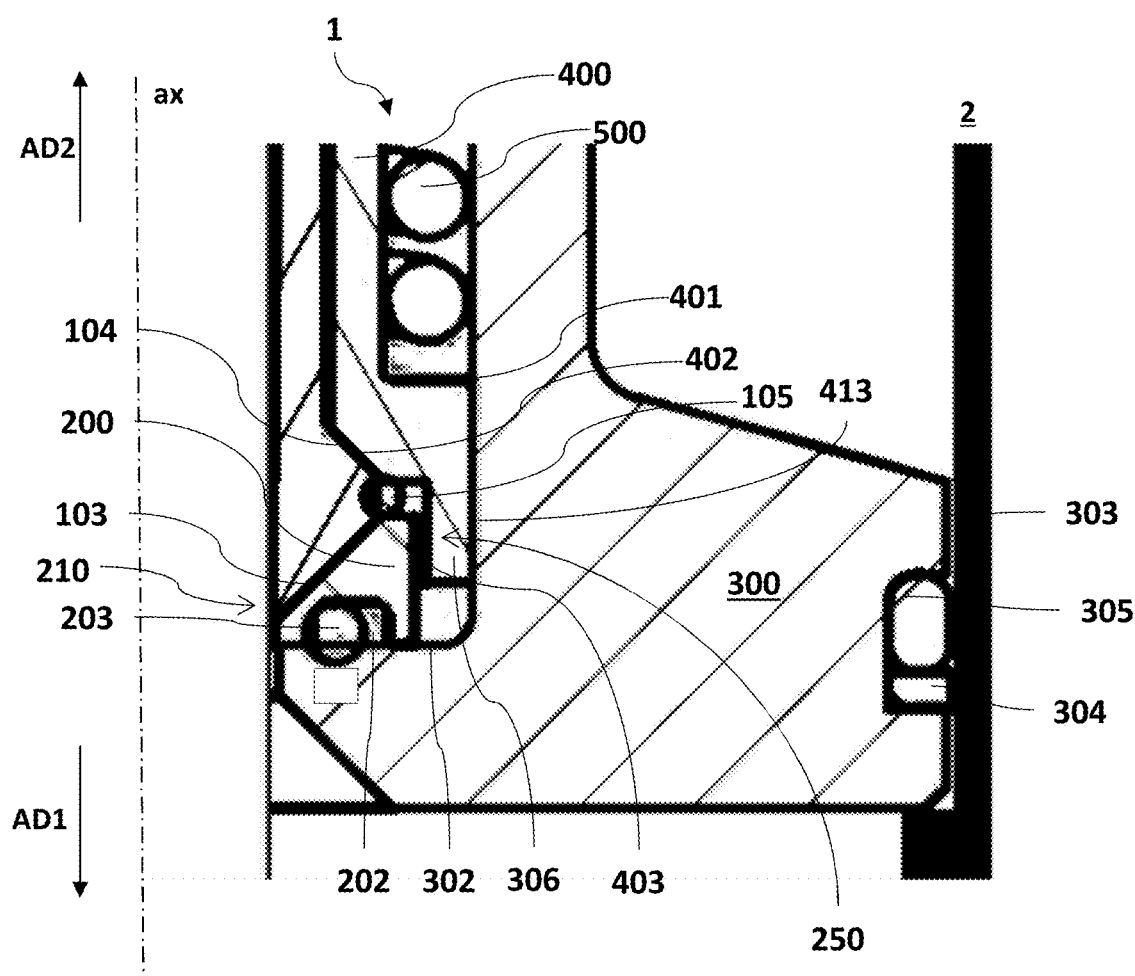
FIG. 2 is a schematic cross-sectional view of an embodiment of a rod seal assembly.

A partial enlargement of the rod seal assembly 1 of FIG. 1 is disclosed in FIG. 2. The internal wall of the bushing 400 may be provided with an internal shoulder portion 402 which may be arranged to interact with a corresponding shoulder portion 104 of the lower portion of the rod seal 101. The shoulder portion 104 of the lower portion of the rod seal 101 may be a conical portion which tapers radially outward, that is, away from the piston rod 100. If the shoulder portion 104 of the lower portion of the rod seal 101 is a conical tapered portion, then the internal shoulder portion 402 of the bushing 400 is a corresponding conical portion, such that the surfaces mate. That is, the internal tapered portion 402 of the bushing 400 may be arranged to abut with the upper conical portion 104 of the lower portion of the rod seal 101. The corresponding conical portions result in an axial force being applied to the rod seal 101 toward the piston rod 100. The internal shoulder portion 402 and the shoulder portion 104 may also be flat, that is, not tapered. The flat surfaces extend laterally outward from the longitudinal axis of the rod seal 101. A flat surface, lacking conical tapers as described above, does not apply any lateral/radial force to the rod seal 101. A force applied by the spring to the bushing 400 applies a force to the rod seal 101 to maintain it in position within the rod seal base 200. The lower portion of the bushing 400 may be provided with a lip 403 which extends past the upper shoulder portion 104 of the lower portion of the rod seal 101 such that the rod seal is substantially enclosed within the bushing 400. The lip 403 may have an internal diameter which is greater than the internal diameter of the upper portion of the bushing 400. The lip may extend in the first axial direction AD1 such that it forms the overlap 250 to the rod seal base 200. The cylindrical outer surface 413 of the lip 403 may be guided in the cylindrical bore 306 of the rod seal housing 300 to secure that the spiral spring 500 limit buckling of the spring 500 which would tilt the bushing 400 and apply a lateral radial force to the rod seal 101. However, if the rod seal assembly 1 is displaced laterally the compression spring 500 as shown in FIGS. 1 and 2 may, in some instances, nevertheless buckle and the lip 403 will not allow lateral movement of the bushing due to its guiding function. As the bushing 400 cannot move laterally more than the play between the lip 403 and the rod seal housing allows, the lateral movement of the rod seal is limited. The lip 403 does however snuggly fit at the overlap 250 to the rod seal base 200, such that the bushing 400 is guided thereby.

A secondary seal ring 105 may be provided between the upper 104 and lower 103 conical portions of the rod seal 101. The secondary seal ring 105 may be for example an O-ring or a similar gasket. The secondary seal ring 105 may seal between the rod seal 101, the bushing 400 and/or the seal seat 200.

The rod seal base 200 is arranged on an internal base 302 of the seal housing 300. The rod seal base 200 is provided with an annular slot 202. The annular slot 202 may be provided with a compliant sealing ring seal 203, for example, an O-ring or similar gasket. The annular slot may house the sealing ring seal 203. The sealing ring seal 203 may at least partially form a seal separating the nominally dry part of the cylinder, from the nominally lubricated part of the cylinder. The annular slot 202 is disclosed to be formed in the rod seal base 200, but can equivalent be formed in the base 302 of the seal housing 300.

The seal housing 300 seals against the wall of the cylinder 2. The radial perimeter 303 of the seal housing 300 may be provided with an annular slot 304. The annular slot 304 may house a seal 305, for example, an O-ring, or similar gasket, which seals the seal housing against the wall of the cylinder 2.

A covering 600 may be provided above the rod seal 101 to seal against ingress of particles to the lubricant on the piston rod 100. The covering 600 is arranged distal the rod seal base 200. That is, the covering 600 is at the opposite end of the rod seal assembly 1 to the rod seal base 200. The covering 600 encloses a region comprising at least the rod seal 101. The covering 600 may be gas-permeable such that it does not form a gas-tight seal. The covering 600 may be an annular member which is arranged between the bushing 400 and a washer 601 arranged on top of the covering 600. A washer 601 is fixed in the seal housing 300 such that it the cover 600 is held in place above the rod seal 101. The covering 600 may, for example, be an annular covering with a central aperture for the piston rod 100. The covering may comprise, such as be composed of, a non-woven textile such as a felt or similar. The non-woven textile has the advantage that it is gas-permeable and absorbs particle matter which may enter the lubricant. The non-woven textile may also partially absorb lubricant. The particle matter present may be metal worn from the piston, piston rings, and other components in the Stirling engine.

Figure 4:
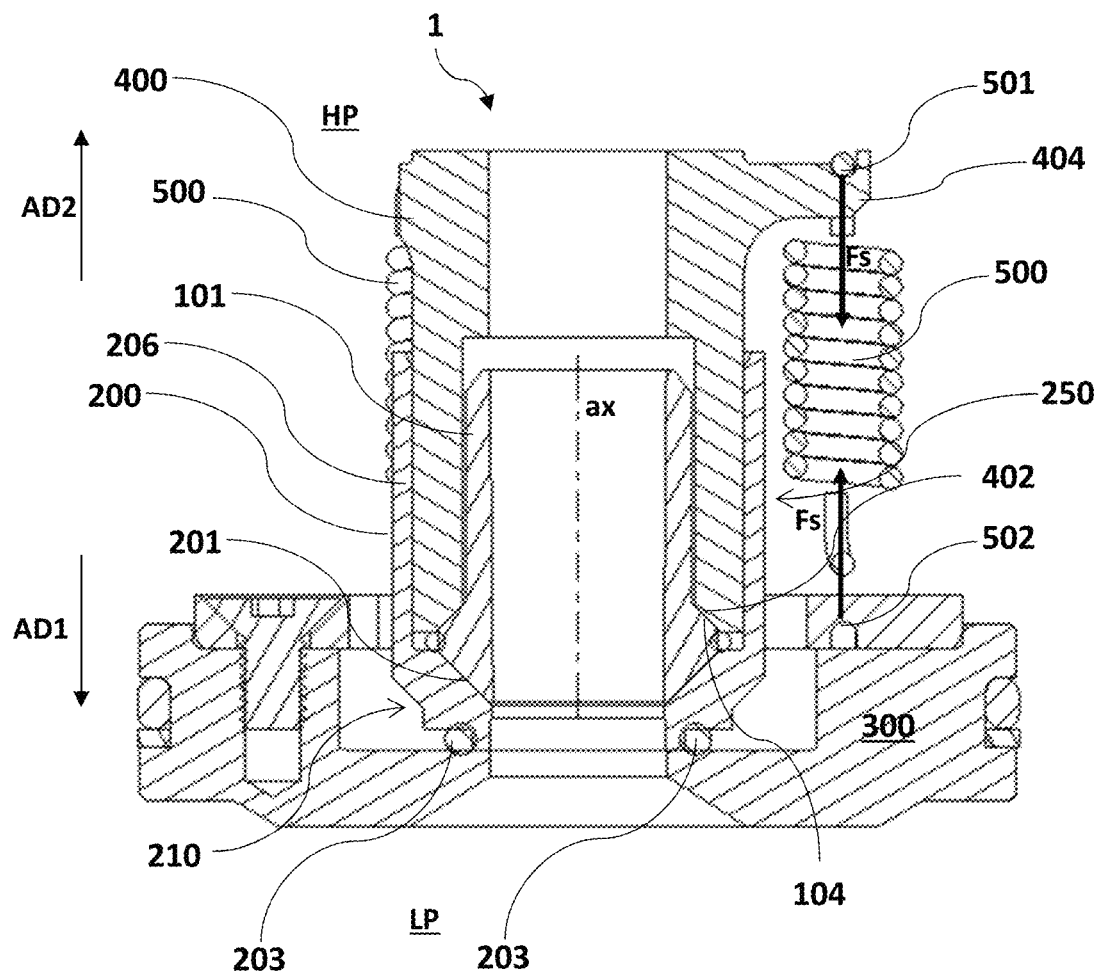
FIGS. 4 and 5 disclose schematic cross-sectional views of different embodiments of a rod seal assembly.
Figure 5:
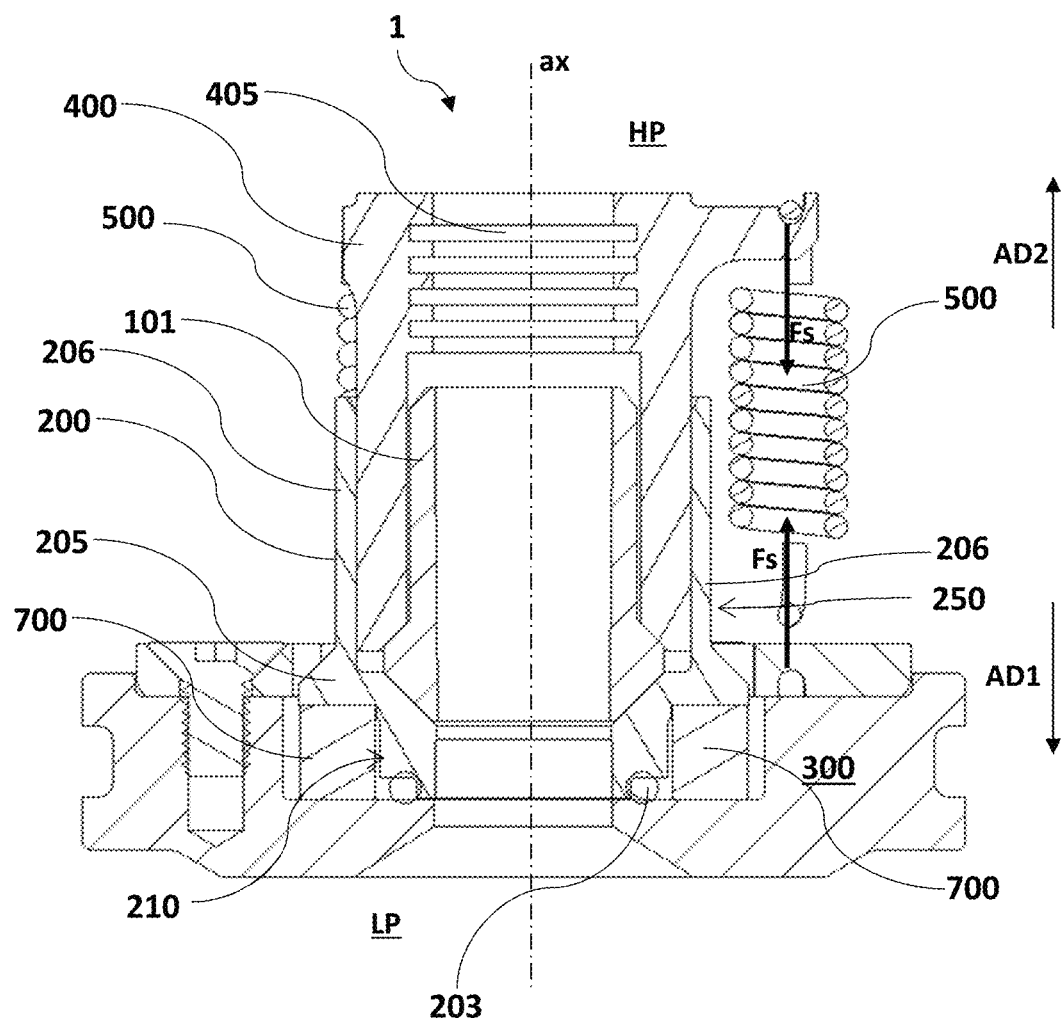

To further reduce friction between the seal housing 300 and the rod seal base 200 the slot 202 of the rod seal base 200 may be open at its outer diameter, as disclosed in FIGS. 4 and 5. That is, the slot 202 may extend to the radial outer wall of the rod seal base 200. The open slot 202 results in a rod seal base 200 having an annular recess around its base portion. The annular recess forms a region of reduced external diameter at the base of the rod seal base 200.

Minimizing friction between the rod seal base 200 and the seal housing 300 results in reduced wear on the rod seal 101, seal housing 300 and piston rod 100. The open annular slot 202 results in surface contact between the seal housing 300 and the rod seal base 200 only at the lubricated portion of the rod seal assembly 1. There is no contact at the nominally dry part of the cylinder which reduces wear.

To further reduce friction between the seal housing 300 and the rod seal base 200, the rod seal base 200 may be coated with a low friction coating such as diamond-like carbon (DLC) or polytetrafluoroethylene (PTFE) or similar coating. The low-friction coating may be combined with the open slot 202 described above or any other friction reducing measure described herein. Alternatively, or combined the internal base 302 of the housing 300 can be covered with the same or similar low friction coating.

To further improve the lateral mobility of the rod seal assembly 1, and therefore reduce friction and wear on the components of the rod seal assembly 1 the rod seal base 200 may comprise an upper portion with a cylindrical aligning wall 206 as shown in the embodiments disclosed in e.g. FIG. 3c, FIG. 4, FIG. 5, FIG. 7, FIG. 8 and FIG. 9.

FIG. 4 discloses rod seal base 200 having a cylindrical wall 206 extending longitudinally from the perimeter of the bottom portion of the rod seal base 200 in the second axial direction AD2. The cylindrical wall 206 extends coaxially with the rod seal 101, and piston rod 100. In the embodiment disclosed in FIG. 4, the rod seal base 200 comprises a conical seat 201. The conical seat 201 forms a seat for the rod seal 101. As described above, the conical seat 201 and the rod seal 101 may also be flat, such that they form a pair of laterally extending mating surfaces. The cylindrical wall 206 forms an aligning wall partially surrounding the bushing 400, and thereby forming the overlap 250, securing that the bushing 400 can follow lateral movements of the rod seal 101 and rod seal base 200. The cylindrical aligning wall 206 may surround the bottom portion of the bushing 400 or extend further upwards in the second axial direction. The cylindrical aligning wall 206 may surround the bottom portion of the rod seal 101. As previously described, to keep the rod seal 101 in place, the rod seal 101 is forced towards the rod seal base 200 through an axial force Fs. The bushing 400 is arranged to surround the upper portion of the rod seal 101. The axial force Fs can be introduced through inherent resilient capacity of the bushing 400 or as disclosed in FIG. 4 by a spring 500.

As described above, in some exemplary embodiments the rod seal base 200 and the rod seal 101 may be integral. In such an arrangement, the lower portion of the bushing 400 is arranged radially between the upper portion of the rod seal 101 and at least a portion of the cylindrical wall 206.

The base portion 210 of the rod seal base 200 may be provided with the open annular slot 202 as described above. The seal 203, such as an O-ring may be provided at the open annular slot 202. The seal 203 seals the lubricated side of the seal assembly 1 from the non-lubricated, or dry side. As described above, the rod seal base 200 may sit on the internal base 302 of the seal housing 300.

A covering 600 may be provided above the rod seal as disclosed above. The covering may be gas permeable. It may comprise, such as be composed of a non-woven material which can prevent particles from entering the lubricant. The covering 600 may be arranged to be held in place by the bushing 400, and/or the rod seal 101. The covering 600 may move laterally with the piston rod 100, rod seal 101, bushing 400, and/or rod seal base 200. The covering 600 is disclosed in the embodiments disclosed in FIG. 1, FIG. 7, FIGS. 8 and 9.

All embodiments of the rod seal assembly 1 disclosed, comprises at least one spring 500 provided to apply the force to the bushing 400, which applies a force at the rod seal 101 towards the rod seal base 200. In some exemplary embodiments of the spring 500, the at least one spring 500 may be extension spring as shown in FIG. 4, FIG. 5, FIG. 7, and FIG. 9. The at least one spring may be connected at a first end 501 to a flange 404 provided on an upper portion of the bushing 400. The flange 404 is an annular lateral flange extending around the upper portion of the bushing 400. The at least one spring 500 may be connected at a second end 502 to the seal housing 300. One exemplary effect of the extension spring is that it does not buckle, and thereby does not need to be held within a bushing to prevent buckling. Furthermore, extension springs do not restrict lateral movement of the rod seal assembly 1 and therefore reduce wear on the seal assembly 1. The at least one spring may be a plurality of springs, or may be one single spring, arranged around the bushing 400 and the rod seal base 200. The single spring can for example be made from bent sheet metal. FIG. 8 discloses an embodiment of the rod seal assembly 1 provided with a compression spring 500, which comprises two annular wave springs 500. The annular wave springs also has the benefit of not buckle. The wave springs are pressed down towards and shoulder of the bushing 400 by a sleeve, which acts between the housing 300 and the springs 500.

As the covering 600 may be gas permeable, during the working cycle of the engine, there may be gas flow to and from the region sealed by the covering. This is due to the pressure differences throughout the working cycle in combination with the resistance of the gas permeable covering 600. This gas flow may lead to lubricant as aerosols being transferred through the covering 600. This leads to lubricant in the nominally dry region of the cylinder and reduced performance. When using extension springs 500 or a wave spring as in FIG. 8, the springs 500 may be arranged radially outside the rod seal 101, the bushing 400, and the rod seal base 200. The provision of springs outside the rod seal 101, the bushing 400 and the rod seal base 200 results in a smaller volume inside the region sealed by the covering 600. By reducing the volume sealed by the covering 600 this gas flow is reduced, as there is less mass within the volume, and therefore there is less or no transfer of lubricant as aerosols. Hence, even though the rod seal assembly 1 embodiments provided with a covering 600 and embodiments having an extension springs 500 must not be combined the combination thereof gives additional exemplary effects, e.g. less or no transfer of lubricants.

Figure 10A:
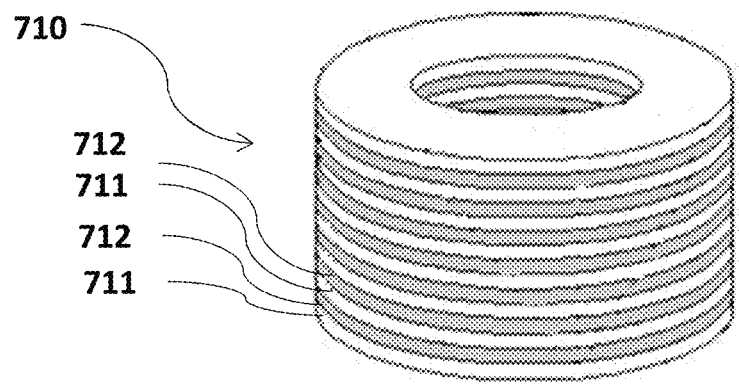
FIG. 10a-c discloses schematic drawings of lateral bearings for a rod seal assembly.
Figure 10B:
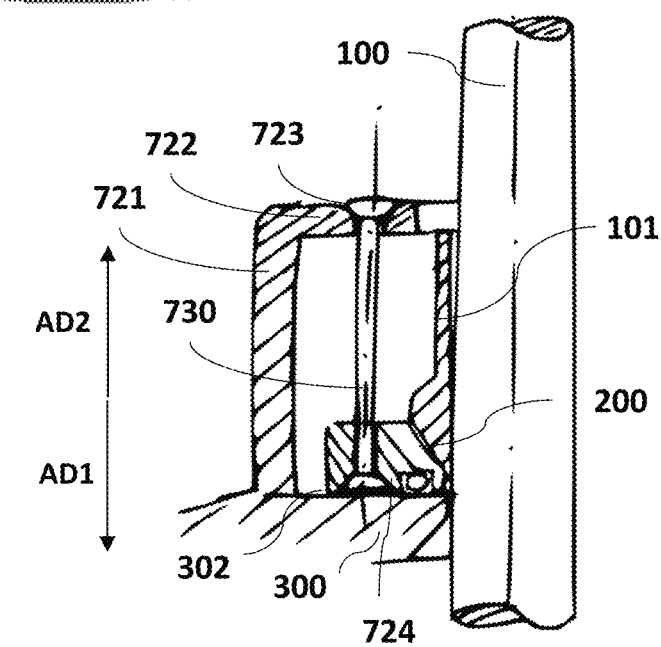
Figure 10C:
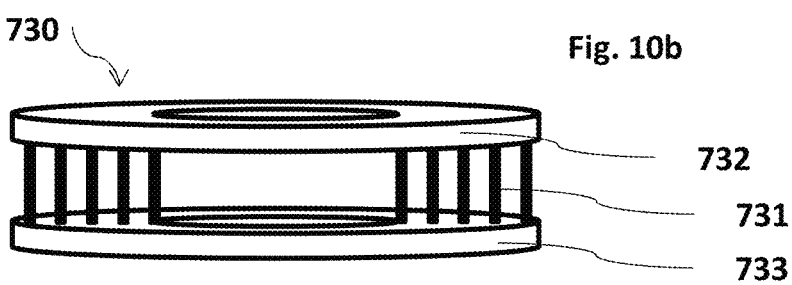

The exemplary embodiment of the rod seal assembly 1 of FIG. 5 is provided with a member 700 having lateral compliance greater than its axial compliance may be provided between the rod seal base 200 and the seal housing 300. FIG. 10a-c discloses different embodiments of the member 700. An embodiment of the member 700 as a laminated bearing 710 is disclosed in FIG. 10a. The laminated bearing 710 may be provided between the rod seal base 200 and the seal housing 300. The laminated bearing 710 comprises a plurality of rigid plate layers 711 interspaced by compliant layers 712. The compliant layers 712 of the laminated bearing 710 enable radial and lateral compliance, whilst providing a substantially rigid axial platform. That is, the bearing 710 is substantially rigid in the axial direction of the piston rod 100 and compliant in the direction perpendicular to the axial direction of the piston rod 100. The laminated bearing 710 effectively decouples the lateral forces from the longitudinal axial forces, that is, the forces in line with the axis of the piston rod 100.

The rod seal base 200 may be arranged to sit on the laminated bearing 710. The rod seal base 200 may be provided with a bearing flange 205 which abuts the laminated bearing 710 at its upper portion. The laminated bearing 710 abuts on the internal base 302 of the seal housing 300. The laminated bearing 710 may be provided radially outside of the seal 203. In some instances, the seal 203 may be excluded, in which case the laminated bearing 701 may form the seal at the lower portion of the rod seal base 200.

In one embodiment of the member 700, instead of, or in addition to the laminated bearing 710 the rod seal base 200 may be provided with a spherical roller bearing (not disclosed), which enable lateral movement of the rod seal base 200. The spherical roller bearing is thereby arranged at the base of the rod seal base 200 and contact the internal base 302 of the seal housing 300. The spherical roller bearing may be arranged radially outside of the seal 203. The spherical bearings enable guided lateral movement of the rod seal assembly 1.

In one exemplary embodiment of the member 700, disclosed in FIG. 10*b*, the member 700 comprises a plurality of laterally displaceable, longitudinally pendulous rods 720 at which the rod seal base 200 is arranged to be supported. In such an arrangement, the seal housing 300 is provided with a member 721 extending from the internal base 302 longitudinally upwards, in the second axial direction AD2 and having a flange 722 extending radially inwards towards the piston rod seal 101. The flange 722 has recesses 723 for receiving each pendulous rod 720. The rod seal base 200 is provided with a recess 724 for receiving each pendulous rod 720. The rod seal base 200 is held longitudinally by the plurality of pendulous rods 720, whilst it can move at least partially laterally. The pendulous rods 720 extends between the flange 722 of the housing 300 and the rod seal base 200.

In one exemplary embodiment of the member 700 disclosed in FIG. 10*c*, the member 700 is a rod bearing 730, which comprises a plurality rods 731 arranged between two sheets 732, 733. The plurality of rods 731 are axial rigid but provide a lateral flexibility in order to allow the lateral movement of the rod seal base 200. The rod bearing 730 is provided to be arranged axial between the rod seal base 200 and the internal base 302 of the housing.

The different embodiments of the member 700 disclosed can be interchanged and combined.

As shown in FIG. 5, a labyrinth seal 405 may be provided in the bushing 400. The labyrinth seal 405 may be provided external to the covering 600, that is, on the opposing side of the covering 600 to the rod seal 101, i.e. the high-pressure side HP. The labyrinth seal 405 further seals the nominally dry part of the cylinder from the ingress of lubricant. The labyrinth seal 405 can comprise one or several recesses in the rod opening of the bushing 400.

FIG. 5 shows an embodiment of the piston rod seal assembly 1 comprising a piston rod 100, an annular rod seal 101 arranged around the piston rod 100. The rod seal 101 has a lower partial conical portion 103. That is, the lower portion of the rod seal 101 has a tapered external surface tapering inwardly toward its center, and therein toward the piston rod 100. The lower conical portion 103 is arranged to contact a separate rod seal base 200. The rod seal base 200 and the rod seal 101 are provided within a seal housing 300. The rod seal base 200 seals between the seal housing 300 and the rod seal 101. The seal housing 300 has a passage 301 through which the piston rod 100 can be arranged and in which it oscillates. The seal housing 300 can furthermore form an enclosure or a partial enclosure for the rod seal assembly 1. The seal housing 300 can also be called seal plate or rod seal plate 300.

In FIG. 1 the exemplary embodiment of the rod seal 101 is provided with an internal diameter which tapers outward towards its upper portion 102 such that it has an internal diameter Du slightly larger than the external diameter Dp of the piston rod 100, at its upper portion 102. E.g. the upper internal diameter Du at the upper portion 102 of the rod seal 101 is larger than the lower internal diameter Dl of the lower conical portion 103 of the rod seal 101 and the upper internal diameter Du is thereby larger than the external diameter Dp of the piston rod 100, which is essentially equal to the lower internal diameter Dl. All the embodiments disclosed herein could be provided with such an rod seal 101.

In the exemplary embodiment of the rod seal 101 disclosed in FIG. 1, FIG. FIG. 2, FIG. 4, FIG. 5, FIG. 7, FIG. 8, FIG. 9, the rod seal base 200 forms a conical seat 201 for the rod seal 101. The rod seal base 200 and the bushing 400 forms an overlap 250 to align the bushing with the lateral movement of the rod seal base 200 and thereby the rod seal 101 and the piston rod 100.

To maintain the lower conical portion 103 of the rod seal 101 within the rod seal base 200 a force Fs is applied to the rod seal 101 toward the rod seal seat 200. The force Fs is an axial force, that is, it acts in the direction of the longitudinal extension of the rod seal 101. The force Fs may be provided by a plurality of springs 500. The springs 500 may apply a force Fs to a bushing 400 which is arranged around the rod seal 101.

The bushing 400 is arranged radially within the cylindrical wall 206 of the rod seal seat 200, or the bushing 400 extends in the first axial direction AD1 to be aligned with the rod seal base 200 at its base portion 200. The bushing 400 has a portion 401 for contacting the rod seal 101. The springs 500 may be arranged at substantially equal circumferential distances around the bushing 400. The springs 500 may be radially outside the bushing 400. That is, the rod seal 101 is provided within the bushing 400, the springs 500 are provided radially outside the bushing 400. The springs 500 may be provided in connection with a flange 404 provided at the upper region of the bushing 400. The springs may connect at their first end to the flange 404 of the bushing 400, or an element fixed to the bushing 400 during operation. The second end of the springs connects to the housing 300.

Figure 7:
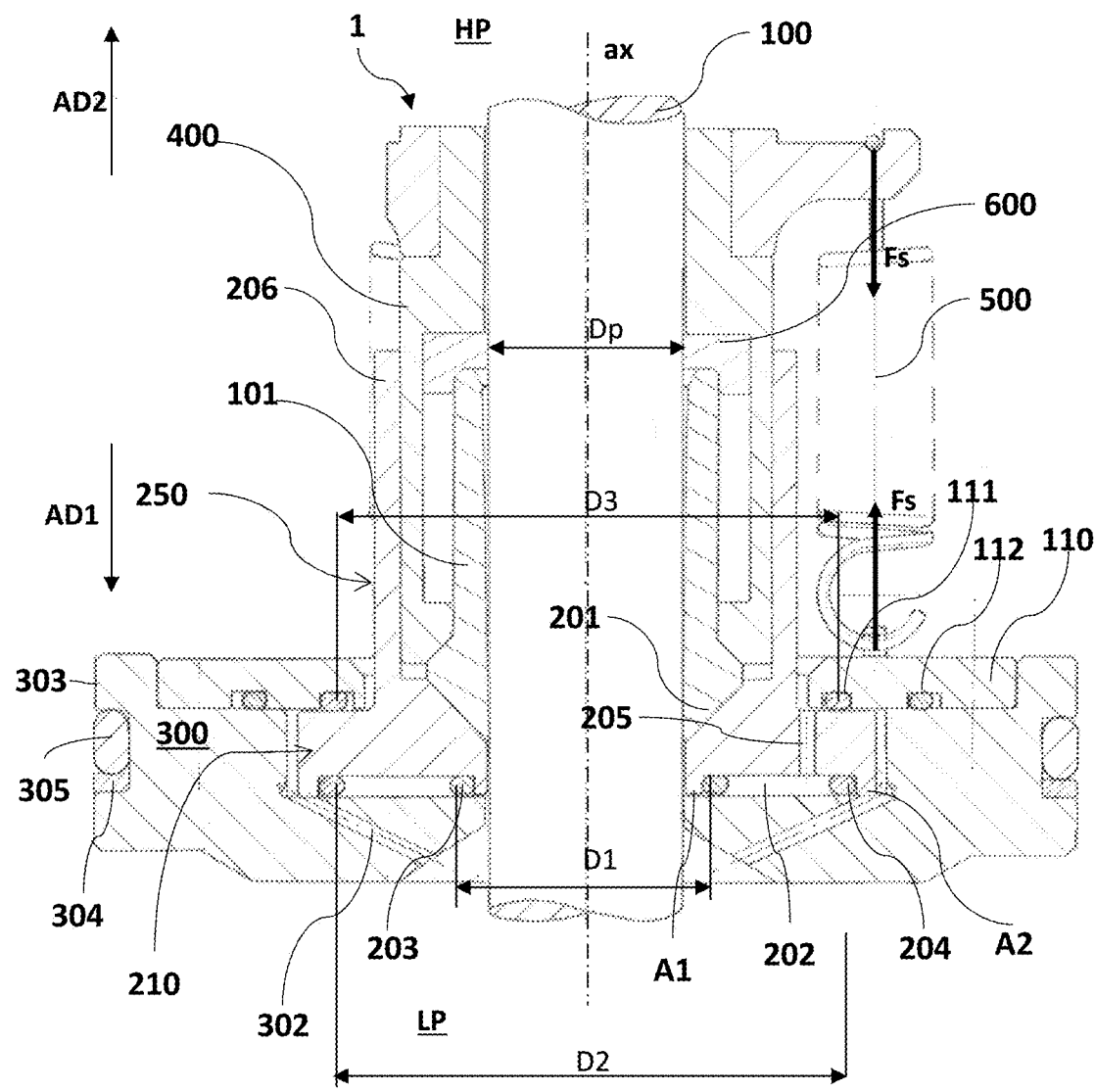
FIG. 7 discloses a schematic cross-sectional view of an embodiment of a rod seal assembly.
Figure 8:
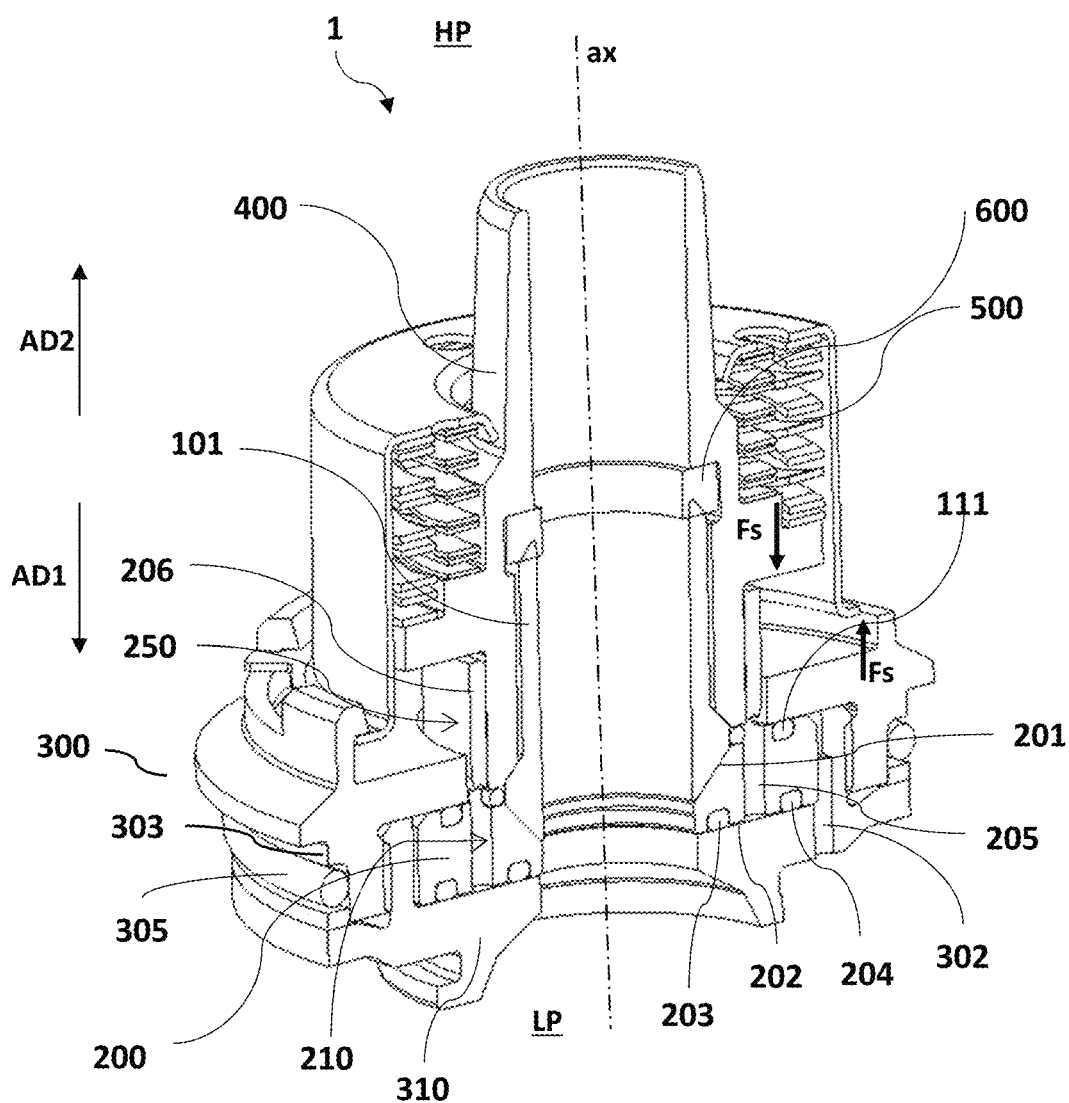
FIG. 8 discloses a schematic cross-sectional perspective view of an embodiment of a rod seal assembly.

In the exemplary embodiment disclosed in FIG. 7, a pressure disc 110 is arranged at the housing, axially above the rod seal base 200. The pressure disc 110 is provided with a first annular slot, and a second annular slot in its base. The annular slots are provided with a compliant seal rings 111, 112.

The first annular slot has a diameter D3, the diameter defines an area A3.

The rod seal base 200 has a recess 202 in its base. The recess 202 is defined by a pair of walls extending in the first axial direction AD1 from the rod seal base 200, perpendicular to the face of lower surface the rod seal base 200.

The recess 202 has a first seal 203 provided at the innermost wall of the recess 202. The first seal 203 has a diameter Dl. The diameter Dl defines and delimits an area A1 which is the area radially within the first seal 203. The area A1 is nominally wet and therefore friction at this area is typically lower than an area which is subject to lubrication during the working cycle.

The recess 202 has a second seal 204 provided at the outermost wall of the recess 202. That is, radially outside the first seal 203. The second seal 204 has a diameter D2.

There is a pressure difference ΔP between the pressure in the crankcase of the hot gas engine, i.e. the low-pressure region LP and the working gas in the cylinder of the hot gas engine, high-pressure region HP. This ΔP applies a normal force to the area A1 at the rod seal 101 towards the rod seal seat 200. As the ΔP may be in the order of 100 bar, this force may be significant and cause wear at the surface of the rod seal base 200 abutting the housing 300.

The diameter of the second seal 204 is greater than the diameter of the annular slot providing the upper seal 111.

A pressure relief channel 205 is provided in the rod seal base 200 from the high-pressure HP region above the pressure disc 110, to the slot 202. The pressure relief channel 205 enables the high-pressure working gas to enter the slot 202 and thereby equalizing the pressures on both axial sides of the rod seal base 300.

By providing the second seal 204 and the upper seal 111 with the above relationship the pressure force on the respective axial side of the rod seal base 200 becomes the same, whereby the normal force where the rod seal base 200 abutting the housing 300 is minimized to be essentially equal to the force Fs applied on the rod seal 101 by the bushing 400. I.e. during the working cycle, it is only the force of the plurality of springs 500 which apply a normal force and may cause friction at the rod seal seat 200.

Pressure compensation occurs according to the relationship, where D1, D2, D3 are as defined above, and Dp the diameter of the piston rod.

$$D2^2 - D3^2 = D1^2 - Dp^2$$

In the exemplary embodiment disclosed in FIG. 7 the innermost wall of the recess 202 has a reduced height with respect to the outer wall of the recess 202, whereby the contact between the innermost wall of the recess 202 and the seal housing 300 may be eliminated. The seal housing 300 is provided with a channel 302 from the lubricated crankcase region of the hot gas engine to the outer wall of the recess 202. This results in the area A2 can be lubricated with lubrication from the piston rod and friction and wear being thus reduced. The force Fs of the springs 500 is therefore only acting on the outermost wall of the slot 202, which is lubricated and therefore friction and wear of the components of the rod seal assembly 1 is reduced.

As before, the seal housing 300 may seal against the wall of the cylinder 2. The radial perimeter 303 of the seal housing 300 may be provided with an annular slot 304. The annular slot 304 may house a seal 305, for example, an O-ring, or similar gasket, which seals the seal housing against the wall of the cylinder.

Figure 9:
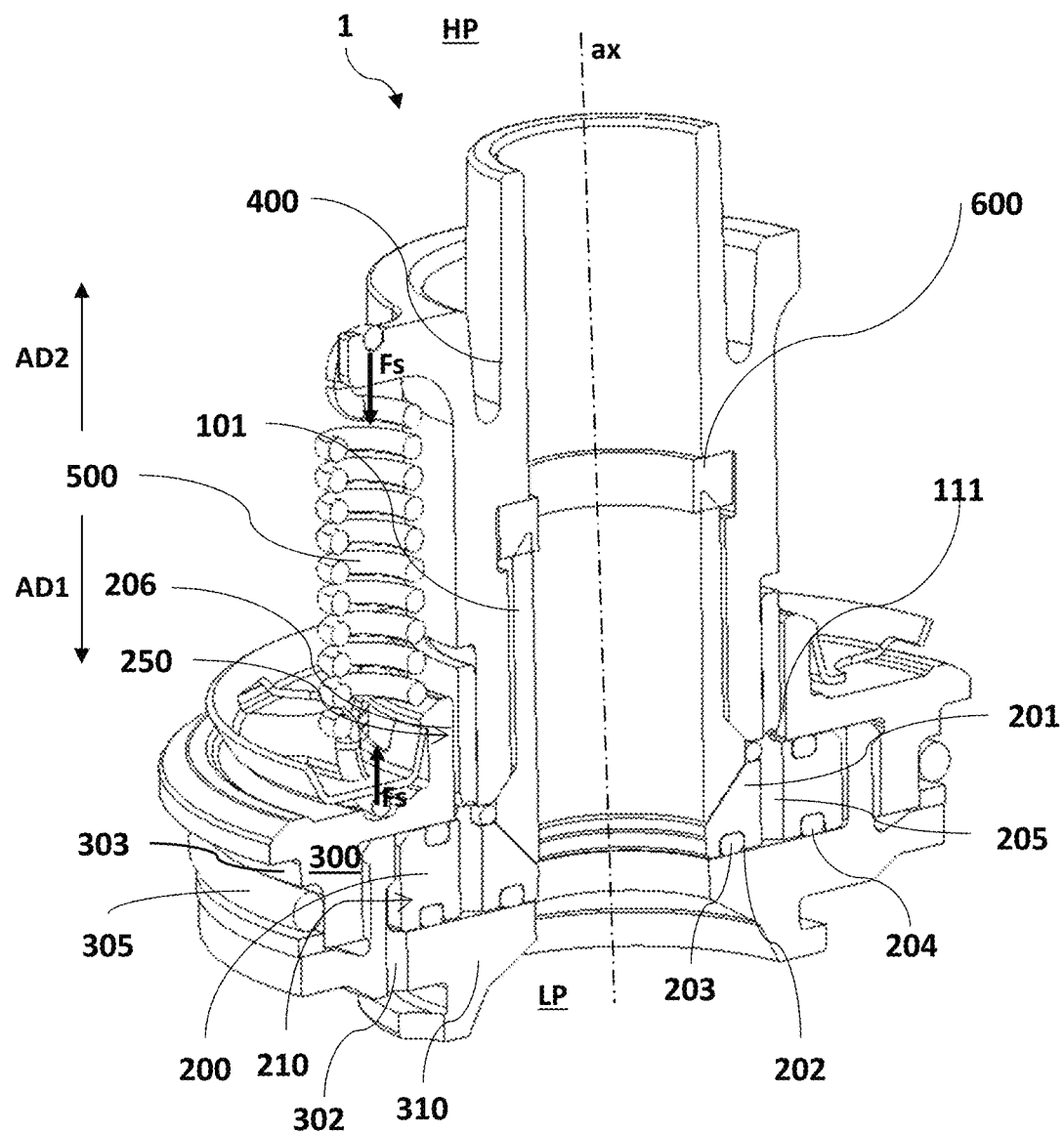
FIG. 9 discloses schematic cross-sectional perspective view of an embodiment of a rod seal assembly.

FIGS. 8 and 9 discloses two embodiments of the rod seal assembly 1, which is provided with the pressure relief channel 205 and the lubrication channel 302 as the embodiment disclosed in FIG. 7. The main difference between the embodiments in FIGS. 8 and 9 and the one in FIG. 7 is that in the embodiments in FIGS. 8 and 9, the pressure plate 110 is replaced with a housing plate 310 arranged on the low pressure side LP of the housing 300. The housing plate 310 can be screwed or in similar way attached to the housing 300.

The difference between the embodiment in FIG. 8 and the embodiment in FIG. 9 is that they are provided with different types of springs 500, which both has been described previously.

Just as for the embodiment disclosed in FIG. 7, in the embodiments disclosed in FIGS. 8 and 9 a pressure equalizing is achieved through that the pressure relief channel 205 connects the space 202 between the inner seal ring 203 and the outer seal ring 204 with the pressure from the high-pressure region HP, and that the upper and lower axial areas of the rod seal base 200 exposed to the pressure from the high pressure region HP are essentially equal, such that their resulting pressure force takes out one another. It is also foreseen that the relation between the upper and the lower axial area is such that the resulting pressure force also counteracts the spring force Fs at least partially, in order to reduce the normal force between the rod seal base 200 and the housing even more.

The terms axial and longitudinal as used in the present disclosure means in line with the axis of oscillation of the piston rod 100. That is, up and down in the FIGS. 1-4. The terms lateral and radial generally mean perpendicular to the axis of oscillation of the piston rod. These definitions are not intended to limit the disclosure but only to clarify the terms in relation to the figures provided and aspects described herein.

Although, the present invention has been described above with reference to specific embodiments, it is not intended to be limited to the specific form set forth herein. Rather, the invention is limited only by the accompanying claims.

In the claims, the term "comprises/comprising" does not exclude the presence of other elements or steps. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A rod seal assembly for a machine comprising a crosshead and a sealed piston rod, wherein the rod seal assembly comprises:
   a seal housing, a rod seal, a bushing and a rod seal base,
   wherein the rod seal, bushing and the rod seal base are annular and can be laterally moved in relation to the seal housing,
   wherein the housing extends radially inwardly to support the rod seal base in an axial direction,
   wherein the rod seal base is adapted to be arranged around the piston rod and is provided with a base portion,
   wherein the base portion comprises:
   a lower axial surface directed in a first axial direction; and
   an upper axial surface directed in a second axial direction,
   wherein the lower axial surface abuts the housing and the upper axial surface is provided with a rod seal seat,
   wherein the lower axial surface is in direct contact with the housing,
   wherein the rod seal is adapted to be arranged around the piston rod, and has a first end portion and a second end portion, wherein the first end portion is arranged to connect to the rod seal base in the first axial direction,
   wherein the bushing is arranged to abut the rod seal in the first axial direction, and wherein the rod seal base and the bushing are arranged to have an axial overlap.

2. The rod seal assembly according to claim 1, wherein the axial overlap is formed by that the bushing extends in the first axial direction towards the rod seal base at least partially past where the bushing abuts the rod seal and/or the rod seal base extends in the second axial direction towards the bushing at least partially past where the rod seal base abuts the rod seal.

3. The rod seal assembly according to claim 1, wherein the rod seal base and the bushing have a radial contact at the axial overlap.

4. The rod seal assembly according to claim 1, wherein the rod seal comprises a shoulder portion, and the bushing comprises a corresponding shoulder portion arranged to mate with the shoulder portion of the rod seal.

5. The rod seal assembly according to claim 4, wherein the shoulder portions are corresponding conical shoulder portions such that a radial force is applied to the rod seal toward the piston rod.

6. The rod seal assembly according to claim 4, wherein the shoulder portion of the rod seal is provided with a secondary seal ring.

7. The rod seal assembly according claim 1, wherein at both axial sides of the base of the rod seal base the seal housing extends radially inwards relative an outer periphery of the base of the rod seal base.

8. The rod seal assembly according to claim 1, wherein an inner seal ring is arranged between lower surface of the base and the seal housing.

9. The rod seal assembly according to claim 8, wherein lower surface of the base is provided with an annular slot, wherein the annular slot is defined by at least one radial inner wall at which the inner seal ring is arranged.

10. The rod seal assembly according to claim 8, wherein an outer seal ring is arranged between the lower surface of the base and the seal housing, wherein the outer seal ring is arranged radially outside the inner seal ring.

11. The rod seal assembly according to claim 10, wherein the annular slot comprising an outer radial wall and the outer seal ring is arranged at the outer radial wall.

12. The rod seal assembly according to claim 10, wherein the base further comprising a pressure relief channel arranged to connect the lower and the upper axial surfaces of the base.

13. The rod seal assembly according to claim 12, wherein the rod seal assembly further comprising an upper seal ring provided between the upper axial surface of the base and the seal housing and the pressure relief channel mouth at the lower axial surface between the inner and outer seal ring and mouth at the upper axial surface radially inside the upper seal ring.

14. The rod seal assembly according to claim 13, wherein the lower axial surface of the base varies in axial extension such that it only abuts the seal housing radially outside the outer seal ring.

15. The rod seal assembly according to claim 13, wherein an outer diameter of the upper seal ring is less than an outer diameter of the outer seal ring.

16. The rod seal assembly according to claim 15, wherein an upper axial surface, of the rod seal base, limited by being radially inside the upper sealing and radially outside the outer sealing is essentially equal to the lower axial surface of the rod seal base radially inside the inner sealing.

17. The rod seal assembly according to claim 10, wherein the housing is provided with a channel extending from outside the rod seal assembly and into the rod seat assembly at a position in the proximity of and radially outside the outer seal ring.

18. The rod seal assembly according to claim 1, wherein the rod seal base comprising a lateral bearing arranged to allow a lateral displacement of the rod seal base and the seal housing.

19. The rod seal assembly according to claim 1, wherein the rod seal assembly is provided with a gas-permeable covering in proximity of the first end portion of the rod seal, wherein the covering is annular and guided by the bushing such that it follows lateral movements of the bushing.

20. The rod seal assembly according to claim 1, wherein the rod seal assembly further comprises at least one spring member arranged to apply an axial force, in the first axial direction, to the rod seal via the bushing.

21. The rod seal assembly according to claim 20, wherein the spring member is arranged radially outside the rod seal and at least partially axial outside the bushing and at least partially at the same axial height as the bushing and preferably the spring member is an extension spring.

22. The rod seal assembly according to claim 21, wherein the bushing is provided with a radial flange wherein the at least one spring member is arranged radially outside of the bushings main body and extends between the flange and the seal housing.

23. A rod seal assembly for a machine comprising a crosshead and a sealed piston rod, wherein the rod seal assembly comprises:
a seal housing, a rod seal, a bushing and a rod seal base, wherein the rod seal, bushing and the rod seal base are annular and can be laterally moved in relation to the seal housing,
wherein the housing axially supports the rod seal base,
wherein the rod seal base is adapted to be arranged around the piston rod and is provided with a base portion,
wherein the base portion comprises:
a lower axial surface directed in a first axial direction; and an upper axial surface directed in a second axial direction,
wherein the lower axial surface abuts the housing and the upper axial surface is provided with a rod seal seat,
wherein the rod seal is adapted to be arranged around the piston rod, and has a first end portion and a second end portion, wherein the first end portion is arranged to connect to the rod seal base in the first axial direction,
wherein the bushing is arranged to abut the rod seal in the first axial direction, and wherein the rod seal base and the bushing are arranged to have an axial overlap,
wherein the rod seal base comprising a lateral bearing arranged to allow a lateral displacement of the rod seal base and the seal housing, and
wherein the lateral bearing comprises a plurality of bearing rods extending from the housing in a first axial direction towards the rod seal base, which is suspended in the bearing rods, or a plurality of laterally displaceable, longitudinally pendulous rods arranged to abut the housing in a first axial direction from the rod seal base, or a circular ball bearing or a laminated bearing comprising a plurality of polymer layers between rigid layers.

24. A machine comprising a crosshead, a sealed oscillating piston rod and the rod seal assembly according to claim 1.

25. The machine according to claim 24, wherein the machine is a stirling engine.

* * * * *